United States Patent [19]

Armitage et al.

[11] Patent Number: 5,071,231
[45] Date of Patent: Dec. 10, 1991

[54] BIDIRECTIONAL SPATIAL LIGHT MODULATOR FOR NEURAL NETWORK COMPUTERS

[75] Inventors: David Armitage, Los Altos; John I. Thackara, Sunnyvale, both of Calif.

[73] Assignee: The United States of America as Represented by the Secretary of the Air Force, Washington, D.C.

[21] Appl. No.: 529,405

[22] Filed: May 24, 1990

[51] Int. Cl.$^5$ .............................................. G02F 1/135
[52] U.S. Cl. ...................................... 359/53; 359/40; 359/71; 359/72; 359/245; 359/292
[58] Field of Search .................... 350/331 R, 342, 335, 350/332, 351, 338, 374, 355, 361, 385, 384, 388, 403, 400, 356

[56] References Cited

U.S. PATENT DOCUMENTS

| | | | |
|---|---|---|---|
| 3,941,455 | 3/1976 | O'Brien | 350/342 |
| 4,019,807 | 4/1977 | Boswell et al. | 350/342 |
| 4,114,991 | 9/1978 | Bleha, Jr. et al. | 350/342 |
| 4,191,457 | 3/1980 | Zingher | 353/44 |
| 4,294,518 | 10/1981 | O'Connor et al. | 350/357 |
| 4,351,589 | 9/1982 | Chavel et al. | 350/335 |
| 4,410,238 | 10/1983 | Hanson | 350/347 E |
| 4,481,531 | 11/1984 | Wanda et al. | 350/374 |
| 4,643,533 | 2/1987 | Armitage | 350/350 S |
| 4,679,910 | 7/1987 | Efron et al. | 350/335 |

OTHER PUBLICATIONS

Tsvetlov et al.—"Picture Logic and Liquid Crystals" Sov. J. Quant. Electron; vol. 4—No. 8—Feb. 1975—pp. 989-993.

Bleha et al.,—"Application of the LCLV to Real-Time Optical Data Processing" Optical Engineering—vol. 17 No. 4—Jul.-Aug. 1978-pp. 371-384.

Primary Examiner—Stanley D. Miller
Assistant Examiner—Tai V. Duong
Attorney, Agent, or Firm—Jacob N. Erlich; Donald J. Singer

[57] ABSTRACT

Digital data processing unit includes two SLMs assembled back-to-back with a common photoreceptor, to form a bidirectional spatial light modulator (BSLM) which facilitates the flow of data in the forward and reverse directions. An image can be written from the left side of the BSLM and read from the left or right side of the unit. An image can also be written from the right side and read from the right or left or both sides of the unit. The photoreceptor sums the light image intensities when data is concurrently written from both sides into the photoreceptor.

6 Claims, 1 Drawing Sheet

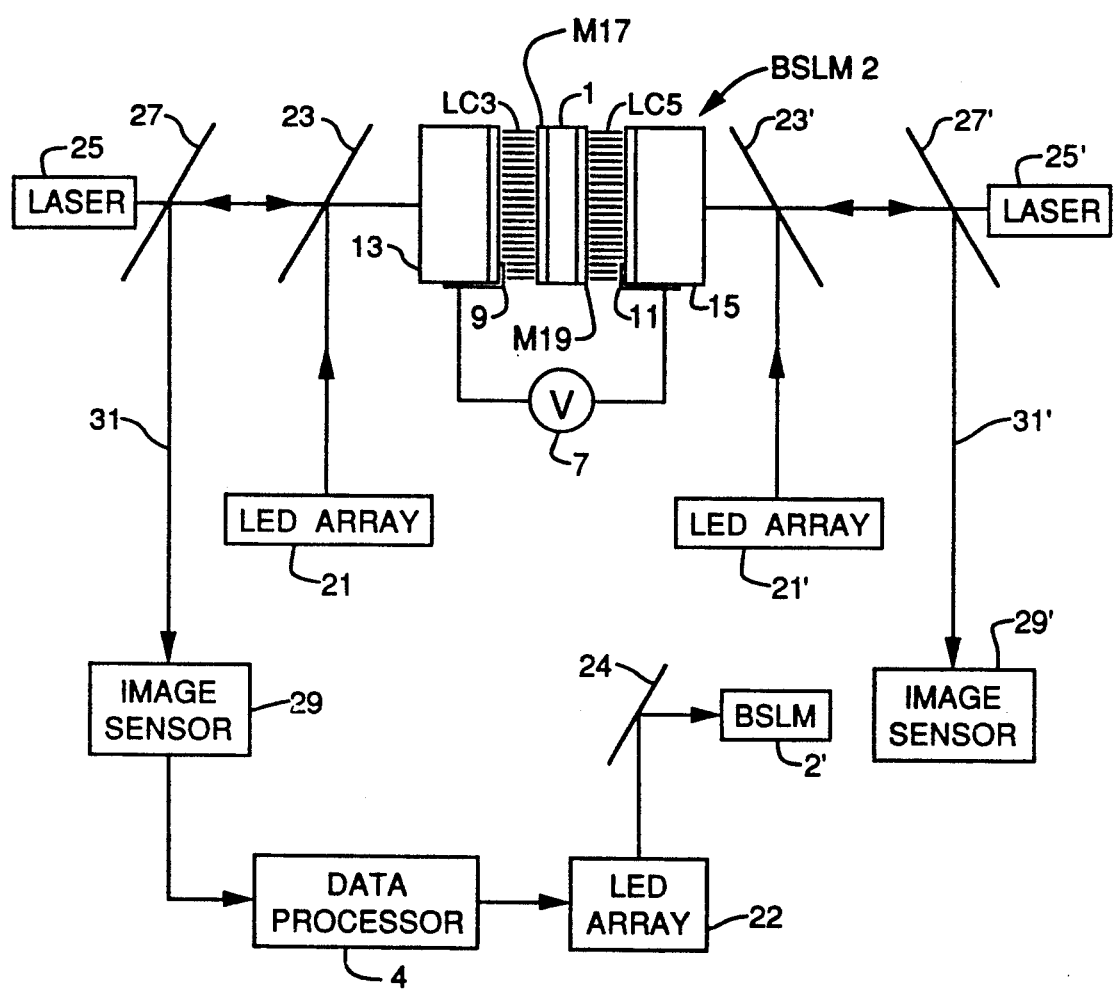

BIDIRECTIONAL SPATIAL LIGHT MODULATOR FOR NEURAL NETWORK COMPUTERS

BACKGROUND OF THE INVENTION

The present invention relates to parallel optical digital processors. Optical digital computing has been explored by many investigators for opto-electronic computing. The various architectures provide substantial speed since many bits of data may be processed in parallel. As explained in considerable detail in "Optical Neural Networks"; John Caulfield et al; proceedings of the IEEE, Vol. 77, No. 10, Oct. 1989; classical optical information processing and classical neural networks can be mutually adapted to create optical neural networks which offer significant advantages over electronic neural networks in various cases.

In an article entitled "Operating Modes of the Microchannel Spatial Light Modulator"; Warde and Thackara; *Optical Engineering*, November/December 1983, pages 695–703; a number of digital data processing operations are described such as and, or, nor, which may be carried out by a spatial light modulator (SLM).

SUMMARY OF A PREFERRED EMBODIMENT OF THE INVENTION

Bidirectional information flow is of critical importance in neural network computing architectures. In order to provide such bidirectionality, a processing unit includes two SLMs assembled back-to-back with a common photoreceptor, to form a bidirectional spatial light modulator (BSLM) which facilitates the flow of data in the forward and reverse directions. An image can be written from the left side of the BSLM and read from the left or right side of the unit. An image can also be written from the right side and read from the right or left or both sides of the unit. The photoreceptor sums the light image intensities when data is concurrently written from both sides into the photoreceptor.

Other objects, features and advantages of the present invention will become apparent upon study of the following detailed description taken in conjunction with the sole FIGURE illustrating an embodiment of the invention.

BRIEF DESCRIPTION OF THE DRAWING

The sole FIGURE is a schematic diagram of the bidirectional spatial light modulator system of the present invention.

DETAILED DESCRIPTION OF THE INVENTION

The operation of the bidirectional spatial light modulator is based upon existing spatial light modulator technology. See, for example, SPIE Vol. 824, 34, 1987 and Spie Vol. 936, 56, 1988. The bidirectional spatial light modulator unit 2 has a planar photoreceptor 1 positioned between liquid crystal layer LC3 and liquid crystal layer LC5. A voltage source 7 is coupled to electrode 9 and electrode 11 as shown, which electrodes are transparent to light. Electrode 9 is mounted upon a first transparent substrate 13, whereas electrode 11 is mounted upon a second transparent substrate 15. Dielectric mirror M17 is positioned between LC3 and photo-receptor 1, whereas dielectric mirror M19 is positioned between LC5 and photoreceptor 1 as shown. The first and second electro-optic crystal means modulate light in accordance with the electrical field passed therethrough, such electrical field established by electrodes 9 and 11. This material could comprise electro-optic crystals, nematic liquid crystals, and ferro-electric liquid crystals, the latter providing bistable operation if desired. Other equivalent electro-optic crystals may, be utilized.

Photoreceptor layer 1 converts incoming write-in light into a charge proportional to the intensity of the light, which in turn changes the electrical field strength in both electro-optic layers LC3 and LC5. Layer 1 may comprise high resistivity silicon wafer, semi-insulating gallium arsenide wafer, or an amorphous silicon coating on a thin insulating substrate or charge transfer plate. Should liquid crystals be used, the cell spacing is maintained by particle spacers, as now practiced by the liquid crystal industry. Exemplary write-in and readout devices will now be described.

A digital matrix of binary ones and zeros, for example, are directed at beam splitter (BS) 23 by, for example, write-in LED array 21, and the light passes through transparent substrate 13, transparent electrode 9, a first electro-optic crystal means LC3, a dielectric mirror M17 and into photoreceptor 1. A CRT could be employed in place of an LED array. The wavelength of this write-in signal could be about 0.8 microns which is absorbed by a silicon photoreceptor 1. As a result, the electrical field strength across LC3 is increased to alter the polarization of the molecules therein to in turn affect the polarization of the readout light as is well-known to those skilled in the art. Readout light source 25, which could be a laser, illuminates the BSLM with readout light, having a wavelength typically of 1.1 microns or greater. Such light passes through BS27, BS23, and through LC3 where it is reflected back through LC3 by M17 and does not substantially enter photoreceptor 1. LCD phase modulated light emerging back through substrate 13, BS23 and at BS27, is reflected downwardly to be directed at image sensor 29, via 31. Some of the pixels having their polarization changed due to the electro-optic effect of LC3, will be directed at image sensor 29, whereas others will not, since BS27 is a polarizing beam splitter. Thus the optical birefringence effect of LC3 modifies the binary "checkerboard" pattern of light directed at image sensor 29.

The above-described operation is repeated by corresponding right hand components 21', 23'; 27', 25', 31' and 29'. If information is written-in concurrently from LED arrays 21 and 21', the information will be summed by photoreceptor 1 so that if a laser 25 at the left side of the BSLM reads out the polarization states within LC3, image sensor 29 will contain information representing the sum of the inputs from LED arrays 21 and 21'. The same result would be attained should a read out from the right side be produced by having laser 25' direct readout light at the right side of the BSLM rather than at the left side thereof.

Thin film polarizers on the surface of photoreceptor 1 or total internal reflection modulation may be employed to allow the read/write beams to interact with the current information content of the electro-optic material. Where optical gain is required, mirrors M17 and M19 discriminate between read/write beam wavelengths to create higher readout power. Thus, an array of binary ones and zeros inputted into the BSLM by the left-hand LED array 21 may be modified by the data inputted into the right side of the BSLM by LED array 21' and the results may thereafter be read out either from the right side by illuminating laser 25' or from the left side by illuminating laser 25. The result is the aforesaid bidirectional information flow, which is of critical importance in neural network computing architectures.

Image sensor 29 could convert the sensed BSLM output image into electrical signals to reproduce the image within a third LED array 22, which emits light having a wavelength under 1 micron so that this LED array may direct reading light into a second BSLM 2' via BS24. The output of image sensor 29 could be modified by a auxiliary digital data processor 4 coupled between output image sensor 29 and input LED array 21 for the first BSLM 2, or input LED array 22 for the second BSLM 2'. Pixel ANDING may be performed in data processor 4 by providing a "pass high pixel signal intensity only" condition. An OR operation could utilize a "pass low pixel signal intensity" condition. A variable electronic threshold circuit in data processor 4 can thus produce ANDING or ORING of the binary data arrays inputted by the LED arrays. In like manner, right hand image sensor 29' could be connected to an additional LED array (not shown) for producing a reading image to be inputted into a third BSLM. Other configurations and interconnections of the apparatus of FIG. 1 will be apparent to the skilled worker in the art.

Other binary logic operations such as EXCLUSIVE OR and NOR intensity level thresholding operations and contrast or edge enhancement operations may be performed by the aforesaid apparatus. See the above mentioned "Optical Engineering" article.

While preferred embodiments of the present invention have been described, numerous variations will be apparent to the skilled worker in the art, and thus the scope of the invention is to be restricted only by the terms of the following claims and art recognized equivalents thereof.

What is claimed is:

1. A bidirectional spatial light modulator system comprising:
    (a) first and second electro-optic crystal means for spatially modulating an incident readout beam by polarization rotation;
    (b) means for applying a voltage across said first and second electro-optic crystal means;
    (c) photoreceptor means positioned between said first and second electro-optic crystal means for absorbing a write-in light image and for spatially modulating voltages applied across said first and second electro-optic crystal means in accordance with said write-in light image;
    (d) first write-in light beam means, for directing a first write-in beam through said first electro-optic crystal means but not said second electro-optic crystal means and into said photoreceptor means;
    (e) second write-in light beam means, for directing a second write-in beam through said second electro-optic crystal means but not said first electro-optic crystal means and into said photoreceptor means;
    (f) first readout beam means, positioned on a first side of said spatial light modulator, for directing a first readout beam through said first electro-optic crystal means but not said second electro-optic crystal means and thereafter back through said first electro-optic crystal means; and
    (g) second readout beam means, positioned on a second side of said spatial light modulator, for directing a second readout beam through said second electro-optic crystal means but not said first electro-optic crystal means and thereafter back through said second electro-optic crystal means; and
    (h) a first dielectric mirror positioned between said first electro-optic crystal means and said photoreceptor means and a second dielectric mirror positioned between said second electro-optic crystal means and said photoreceptor means.

2. The spatial light modulator of claim 1 including means for causing said first and second write-in beam means to direct said first and second write-in beams concurrently into said photoreceptor for causing a readout beam to produce a signal proportional to the sums of the intensities of said first and second write-in beams.

3. The spatial light modulator of claim 1 including means for causing said first and second write-in beam means to direct said, first and second write-in beams concurrently into said photoreceptor for causing a readout beam to produce a signal proportional to the sums of the intensities of said first and second write-in beams.

4. A bidirectional spatial light modulator system comprising:
    (a) first and second liquid crystal means for spatially modulating an incident readout beam by polarization rotation;
    (b) means for applying a voltage across said first and second liquid crystal means;
    (c) photoreceptor means positioned between said first and second liquid crystal means for absorbing a write-in light image and for spatially modulating voltages applied across said first and second liquid crystal means in accordance with said write-in light image;
    (d) first write-in light beam means, positioned on a first side of said spatial light modulator, for directing a first write-in beam through said first liquid crystal means but not said second liquid crystal means and into said photoreceptor means;
    (e) second write-in light beam means, positioned on a second side of said spatial light modulator opposite said first side, for directing a second write-in beam through said second liquid crystal means but not said first liquid crystal means and into said photoreceptor means;
    (f) first readout beam means, positioned on said first side of said spatial light modulator, for directing a first readout beam through said first liquid crystal means but not said second liquid crystal means and thereafter back through said first liquid crystal means; and
    (g) second readout beam means, positioned on said second side of said spatial light modulator, for directing a second readout beam through said second liquid crystal means but not said first liquid crystal means and thereafter back through said second liquid crystal means; and
    (h) a first dielectric mirror positioned between said first electro-optic crystal means and said photoreceptor means and a second dielectric mirror positioned between said second electro-optic crystal means and said photoreceptor means.

5. The spatial light modulator of claim 4 including means for causing said first and second write-in beam means to direct said first and second write-in beams concurrently into said photoreceptor for in turn causing a readout beam to produce a signal proportional to the sums of the intensities of said first and second write-in beams.

6. The spatial light modulator of claim 4 including means for causing said first and second write-in beam means to direct said first and second write-in beams concurrently into said photoreceptor for causing a readout beam to produce a signal proportional to the sums of the intensities of said first and second write-in beams.

* * * * *